US012801045B2

(12) United States Patent
Takatsuna

(10) Patent No.: US 12,801,045 B2
(45) Date of Patent: Nov. 17, 2026

(54) IMAGE FORMING APPARATUS AND IMAGE FORMATION METHOD

(71) Applicant: KYOCERA Document Solutions Inc., Osaka (JP)

(72) Inventor: Toru Takatsuna, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 362 days.

(21) Appl. No.: 18/489,812

(22) Filed: Oct. 18, 2023

(65) Prior Publication Data

US 2024/0134297 A1 Apr. 25, 2024
US 2024/0231248 A9 Jul. 11, 2024

(30) Foreign Application Priority Data

Oct. 25, 2022 (JP) ................................ 2022-170631

(51) Int. Cl.
*G03G 9/083* (2006.01)
*G03G 9/097* (2006.01)
*G03G 15/08* (2006.01)

(52) U.S. Cl.
CPC ......... *G03G 9/0839* (2013.01); *G03G 9/0836* (2013.01); *G03G 9/0838* (2013.01); *G03G 9/09708* (2013.01); *G03G 15/0822* (2013.01)

(58) Field of Classification Search
CPC .. G03G 9/0839; G03G 9/0836; G03G 9/0838; G03G 9/09708; G03G 15/0822
See application file for complete search history.

(56) References Cited

U.S. PATENT DOCUMENTS 9,726,994 B1 8/2017 Eri et al.
2006/0160006 A1 7/2006 Yamazaki et al.
2008/0292983 A1* 11/2008 Mizuhata ............... G03G 13/08 430/108.6
2020/0257215 A1* 8/2020 Kobayashi ......... G03G 9/09716

FOREIGN PATENT DOCUMENTS

JP H11-327302 A 11/1999
JP 2005121958 A 5/2005
JP 2006-171717 A 6/2006
JP 2009-192722 A 8/2009
JP 2017-142399 A 8/2017
JP 2020-129031 A 8/2020

* cited by examiner

*Primary Examiner* — Boone Alexander Evans
(74) *Attorney, Agent, or Firm* — Studebaker Brackett PLLC

(57) ABSTRACT

An image forming apparatus includes a magnetic toner, an image bearing member, and a development device. The image bearing member is an amorphous silicon photosensitive drum. The magnetic toner includes toner particles. The toner particles each include a toner mother particle containing a binder resin and a magnetic powder and alumina particles attached to a surface of the toner mother particle. The alumina particles each include a core containing alumina and a conductive layer covering the core. The conductive layer contains antimony tin oxide. The alumina particles have a number average primary particle diameter of at least 0.15 μm and no greater than 0.50 μm. The alumina particles have a specific resistance of no greater than 250 Ω·cm. The alumina particles have an X-ray intensity ratio of at least 0.25 and no greater than 0.35.

8 Claims, 4 Drawing Sheets

IMAGE FORMING APPARATUS AND IMAGE FORMATION METHOD

INCORPORATION BY REFERENCE

The present application claims priority under 35 U.S.C. § 119 to Japanese Patent Application No. 2022-170631, filed on Oct. 25, 2022. The contents of this application are incorporated herein by reference in their entirety.

BACKGROUND

The present disclosure relates to an image forming apparatus and an image formation method.

There are known image formation methods using a toner for one-component development. With extension of the life of image forming apparatuses, it is required to maintain stable image characteristics over a long period of time.

In order to maintain favorable developability over a long period of time, some toner for one-component development includes toner particles including on the surfaces thereof inorganic fine particles and fine particles of a conductive metal compound. The toner for one-component development is used in an image formation method that includes at least an image bearing member charging step, a latent image forming step, and a developing step and that carries out image formation by repeating the steps. It is known that an organic photoconductor photosensitive member (OPC photosensitive member) is used as the image bearing member.

SUMMARY

An image forming apparatus according to an aspect of the present disclosure includes a magnetic toner, an image bearing member, and a development device. The development device develops an electrostatic latent image formed on the image bearing member into a toner image with the magnetic toner. The image bearing member is an amorphous silicon photosensitive drum. The magnetic toner includes toner particles. The toner particles each include a toner mother particle containing a binder resin and a magnetic powder and alumina particles attached to a surface of the toner mother particle.

The alumina particles each include a core containing alumina and a conductive layer covering the core. The conductive layer contains antimony-doped tin oxide. The alumina particles have a number average primary particle diameter of at least 0.15 μm and no greater than 0.50 μm. The alumina particles have a specific resistance of no greater than 250 Ω·cm. The alumina particles have an X-ray intensity ratio of at least 0.25 and no greater than 0.35. The X-ray intensity ratio of the alumina particles is a ratio of an X-ray intensity of a peak derived from an antimony element contained in the alumina particles to an X-ray intensity of a peak derived from a tin element contained in the alumina particles. The X-ray intensity of the peak derived from the antimony element and the X-ray intensity of the peak derived from the tin element are measured by X-ray fluorescence analysis.

An image formation method according to an aspect of the present disclosure includes developing an electrostatic latent image formed on an image bearing member into a toner image with a magnetic toner. The image bearing member is an amorphous silicon photosensitive drum. The magnetic toner includes toner particles. The toner particles each include a toner mother particle containing a binder resin and a magnetic powder and alumina particles attached to a surface of the toner mother particle. The alumina particles each include a core containing alumina and a conductive layer covering the core. The conductive layer contains antimony tin oxide. The alumina particles have a number average primary particle diameter of at least 0.15 μm and no greater than 0.50 μm. The alumina particles have a specific resistance of no greater than 250 Ω·cm. The alumina particles have an X-ray intensity ratio of at least 0.25 and no greater than 0.35. The X-ray intensity ratio of the alumina particles is a ratio of an X-ray intensity of a peak derived from an antimony element contained in the alumina particles to an X-ray intensity of a peak derived from a tin element contained in the alumina particles.

The X-ray intensity of the peak derived from the antimony element and the X-ray intensity of the peak derived from the tin element are measured by X-ray fluorescence analysis.

DETAILED DESCRIPTION

Figure 1:
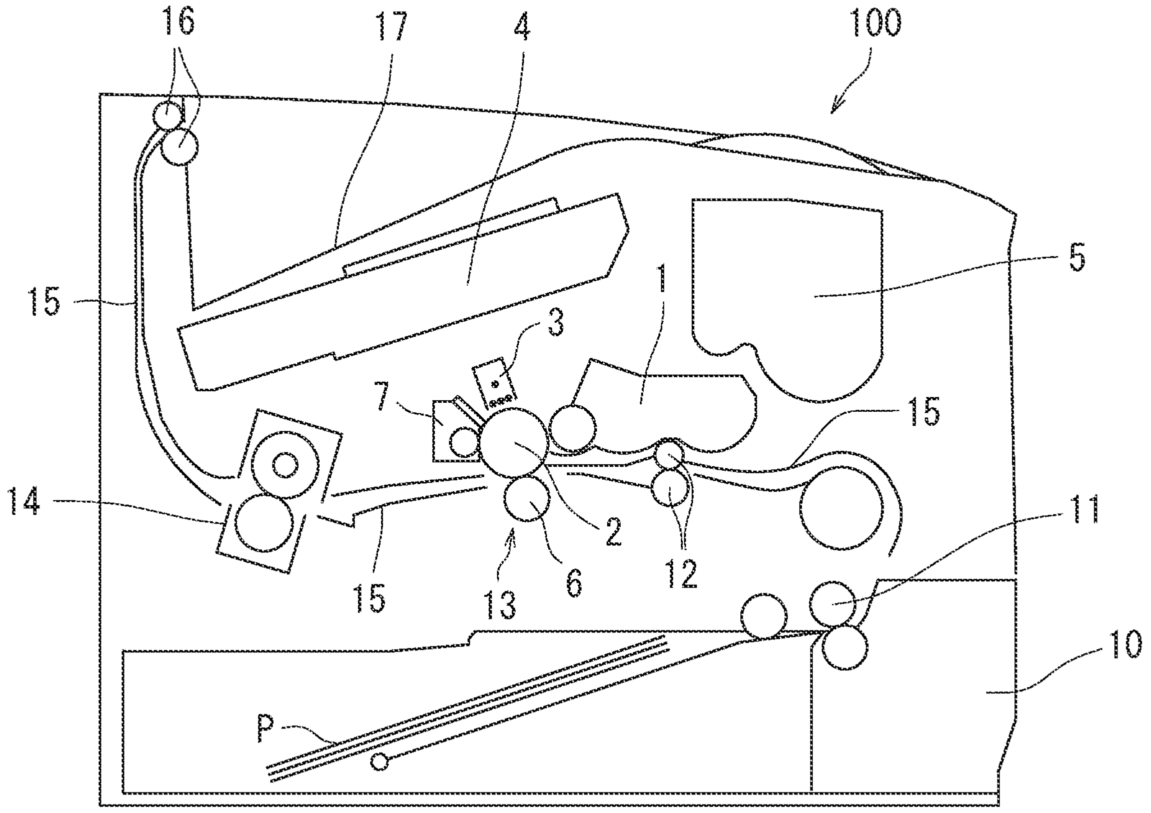
FIG. 1 is a diagram illustrating an example of an image forming apparatus according to a first embodiment of the present disclosure.

The following describes embodiments of the present disclosure. Terms used in the present specification are described first. A magnetic toner is a collection (e.g., a powder) of toner particles. A magnetic powder is a collection (e.g., a powder) of magnetic particles. An external additive is a collection (e.g., a powder) of external additive particles. Unless otherwise stated, evaluation results (specific examples include values indicating shape or physical properties) for a powder are number averages of values as measured for a suitable number of particles selected from the powder. The oil absorption of a measurement target is a value as measured in accordance with the Japanese Industrial Standards (JIS) K5101-13-1:2004 unless otherwise stated. Values for cumulative value at 50% (volume median diameter "$D_{50}$") in a particle size distribution of a measurement target in terms of volume are median diameters as measured using a laser diffraction/light scattering type particle size distribution analyzer (e.g., "LA-950", product of HORIBA, Ltd.) unless otherwise stated. Unless otherwise stated, the number average particle diameter of a measurement target is a number average value of equivalent circle diameters of primary particles (Heywood diameters: diameters of circles having the same areas as projected areas of the primary particles) of the measurement target as measured using a scanning electron microscope. The number average primary particle diameter of a measurement target is a number average value of equivalent circle diameters of 100 primary particles of the measurement target, for example. The acid value of a measurement target is a value as measured in accordance with the Japanese Industrial Standards (JIS) K0070-1992 unless otherwise stated. The number average molecular weight (Mn) and mass average molecular weight (Mw) of a measurement target are values as measured using gel permeation chromatography. Hydrophobicity (or hydrophilicity) can be expressed by a contact angle of a water droplet (ease of getting wet with water), for example. A lager contact angle of a water droplet indicates stronger hydrophobicity. Hydrophobic treatment refers to a treatment for increasing hydrophobicity. One type of each component described in the present specification may be used independently, or two or more types of the component may be used in combination. Terms used in the present specification have been described so far. Note that the drawings schematically illustrate elements of configuration in order to facilitate understanding. Properties such as the size, number, and shape of each element of configuration illustrated in the drawings may differ from actual properties in order to facilitate preparation of the drawings. Furthermore, the present disclosure is not limited to the following embodiments and the drawings and various alterations thereof may be made within the scope of the purpose of the present disclosure.

First Embodiment: Image Forming Apparatus

The following describes an image forming apparatus according to a first embodiment of the present disclosure. The image forming apparatus of the first embodiment includes a magnetic toner, an image bearing member, and a development device. The development device develops an electrostatic latent image formed on the image bearing member into a toner image with the magnetic toner. The image bearing member is an amorphous silicon photosensitive drum. The magnetic toner includes toner particles. The toner particles each include a toner mother particle and alumina particles. The toner mother particle contains a binder resin and a magnetic powder. The alumina particles are attached to the surface of the toner mother particle. The alumina particles each include a core and a conductive layer. The core contains alumina. The conductive layer covers the core. The conductive layer contains antimony tin oxide. The alumina particles have a number average primary particle diameter of at least 0.15 μm and no greater than 0.50 μm. The alumina particles have a specific resistance of no greater than 250 Ω·cm. The alumina particles have an X-ray intensity ratio of at least 0.25 and no greater than 0.35. The X-ray intensity ratio of the alumina particles is a ratio of the X-ray intensity of a peak derived from an antimony element contained in the alumina particles to the X-ray intensity of a peak derived from a tin element contained in the alumina particles. The X-ray intensity of the peak derived from the antimony element and the X-ray intensity of the peak derived from the tin element are measured by X-ray fluorescence analysis. In the following, the "magnetic toner" may be also referred to below simply as a "toner". Also, the "X-ray intensity ratio of the alumina particles", that is, the "ratio of the X-ray intensity of the peak derived from the antimony element contained in the alumina particles to the X-ray intensity of the peak derived from the tin element contained in the alumina particles, the X-ray intensity of the peak derived from the antimony element and the X-ray intensity of the peak derived from the tin element being measured by X-ray fluorescence analysis" may be also referred to below simply as an "Sb/Sn ratio".

As a result of having the above features, the image forming apparatus of the first embodiment can form images with desired image density even when many sheets are printed and with less fogging, and can inhibit occurrence of image deletion even in a high humidity environment. The reasons thereof may be inferred as follows.

The image forming apparatus of the first embodiment includes an amorphous silicon photosensitive drum as an image bearing member. The amorphous silicon photosensitive drum has higher hardness and higher durability than organic photosensitive members, and therefore, the image forming apparatus can have extended life. However, the surface of the amorphous silicon photosensitive drum tends to easily absorb moisture. Absorbed moisture makes it easy for discharge products to adhere to the surface of the amorphous silicon photosensitive drum, which may cause image deletion in formed images. Image deletion is an image defect in which an image is turbulent and runs off in a conveyance direction of a recording medium due to presence of discharge products adhering to the surface of the image bearing member. Image deletion tends to occur especially in a high humidity environment with a lot of moisture in the atmosphere.

In view of the foregoing, the alumina particles are set to have a number average primary particle diameter of at least 0.15 μm in the first embodiment. As a result of the number average primary particle diameter of the alumina particles being set to at least 0.15 μm, the surface of the amorphous silicon photosensitive drum is polished by the alumina particles with high hardness to facilitate removal of the discharge products adhering to the surface of the amorphous silicon photosensitive drum. As a result, occurrence of image deletion can be inhibited even in image formation in a high humidity environment.

Furthermore, the alumina particles are set to have a number average primary particle diameter of no greater than 0.50 μm in the first embodiment. As a result of the number average primary particle diameter of the alumina particles being set to no greater than 0.50 μm, the toner particles including the alumina particles can easily flow in the development device, thereby achieving formation of images with desired image density even when many sheets are printed.

The alumina particles have a specific resistance of no greater than 250 Ω·cm in the first embodiment. The alumina particles having a specific resistance of no greater than 250 Ω·cm are rendered suitably conductive to enable smooth charge transfer between toner particles that includes the alumina particles. As a result, the toner can have a sharp charge distribution, thereby enabling formation of images with desired image density even when many sheets are printed and with less fogging.

The alumina particles each include a core containing alumina and a conductive layer covering the core and containing antimony tin oxide. With the conductive layers such as above, the alumina particles are made suitably conductive. However, this makes adhesion between the cores containing alumina and the conductive layers containing antimony tin oxide tend to be weak.

In view of the foregoing, the alumina particles are set to have an Sb/Sn ratio of at least 0.25 and no greater than 0.35 in the first embodiment. The smaller the Sb/Sn ratio of the alumina particles is, the higher the specific resistance of the alumina particles tends to be. When the Sb/Sn ratio of the alumina particles is less than 0.25, the alumina particles tend to have high specific resistance. Therefore, it is necessary to add a large amount of antimony tin oxide to the cores so that the specific resistance of the alumina particles does not become excessively high. As a result, the conductive layers of the alumina particles become thick with a result that the conductive layers easily peel off from the cores of the alumina particles upon application of friction force to the toner particles in the development device. When the alumina particles have an Sb/Sn ratio of greater than 0.35 by contrast, the amount of antimony in the conductive layers is large with a result that adhesion between the cores containing alumina and the conductive layers containing antimony tin oxide tends to be weak. As a result, the conductive layers easily peel off from the cores of the alumina particles upon application of friction force to the toner particles in the development device. When the Sb/Sn ratio of the alumina particles is at least 0.25 and no greater than 0.35, the conductive layers can be inhibited from peeling off from the cores of the alumina particles and appropriate conductivity of the alumina particles can be maintained even when many sheets are printed. As a result, images with desired image density even when many sheets are printed and with less fogging can be formed.

The reasons have been described so far why the image forming apparatus of the first embodiment can form images with desired image density even when many sheets are printed and with less fogging and can inhibit occurrence of image deletion even in a high humidity environment.

The following describes an image forming apparatus 100 as an example of the image forming apparatus of the first embodiment with reference to FIG. 1. FIG. 1 is a diagram illustrating the image forming apparatus 100.

The image forming apparatus 100 illustrated in FIG. 1 includes a sheet cassette 10, a sheet feed roller 11, a registration roller pair 12, an image formation section 13, a fixing section 14, a sheet conveyance path 15, an ejection roller pair 16, and an exit tray 17. The sheet conveyance path 15 extends from above the sheet cassette 10 to the exit tray 17. Along the sheet conveyance path 15, the sheet feed roller 11, the registration roller pair 12, the image formation section 13, the fixing section 14, and the ejection roller pair 16 are arranged in the stated order from upstream in a conveyance direction of a sheet P.

The sheet cassette 10 is provided in the lower part of the main body of the image forming apparatus 100. The sheet cassette 10 accommodates at least one sheet P of paper.

The sheet feed roller 11 feeds the sheet P from the sheet cassette 10. The sheet P fed from the sheet feed roller 11 is conveyed to the registration roller pair 12.

The registration roller pair 12 temporarily stops the sheet P and then sends the sheet P to the image formation section 13.

The image formation section 13 includes a toner T (see FIG. 2) being a magnetic toner, an image bearing member 2, a charger 3, a light exposure device 4, a development device 1, a toner container 5, a transfer roller 6, and a cleaner 7. The charger 3, the light exposure device 4, the development device 1, the transfer roller 6, and the cleaner 7 are arranged around the image bearing member 2. The toner container 5 accommodates the toner T. The toner container 5 is disposed above the development device 1 and replenishes the development device 1 with the toner T.

The image bearing member 2 is axially supported in a rotatable manner in the clockwise direction in FIG. 1. The image bearing member 2 is an amorphous silicon photosensitive drum. Application of a specific voltage to the charger 3 uniformly charges the surface of the image bearing member 2. Next, light irradiation by the light exposure device 4 forms an electrostatic latent image on the surface (e.g., the circumferential surface) of the image bearing member 2. The electrostatic latent image is formed based on input image data. The development device 1 supplies the toner T to the electrostatic latent image on the surface of the image bearing member 2 to form a toner image on the surface of the image bearing member 2. In the manner described above, the development device 1 develops the electrostatic latent image formed on the image bearing member 2 (more specifically, the surface of the image bearing member 2) into a toner image with the toner T. Thus, the image bearing member 2 carries the toner image.

Next, the sheet P is supplied to a gap (transfer point) between the image bearing member 2 and the transfer roller 6 from the registration roller pair 12. The transfer roller 6 transfers the toner image on the surface of the image bearing member 2 to the sheet P. The sheet P with the toner image transferred thereto is conveyed to the fixing section 14. The fixing section 14 applies either or both heat and pressure to the sheet P with the toner image transferred thereto. Through application of at least one of heat or pressure, the toner image is fixed to the sheet P, thereby forming an image on the sheet P. The ejection roller pair 16 ejects the sheet P with the image formed thereon onto the exit tray 17. The toner T remaining on the surface of the image bearing member 2 after transfer is collected by the cleaner 7. The image bearing member 2 is re-charged by the charger 3, and image formation is performed in the same manner as above.

Figure 2:
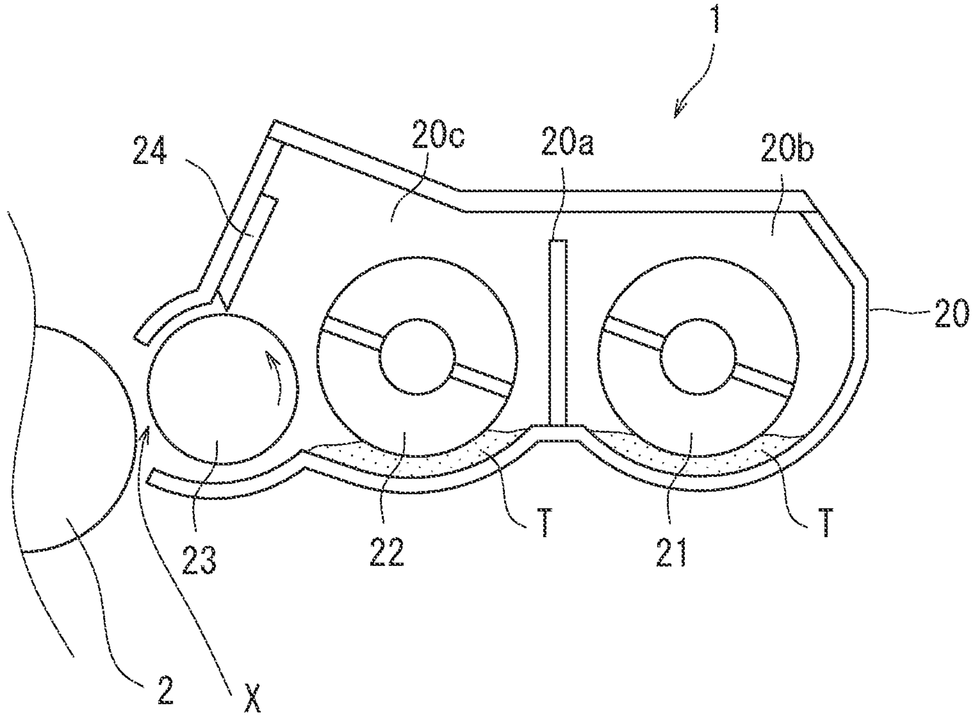
FIG. 2 is a diagram illustrating an image bearing member and a development device illustrated in FIG. 1.

The development device 1 included in the image forming apparatus 100 is described below further in detail with reference to FIG. 2. FIG. 2 is a diagram illustrating the image bearing member 2 and the development device 1. The development device 1 illustrated in FIG. 2 includes an accommodation section 20, a plurality of stirring screws (corresponding to a first stirring screw 21 and a second stirring screw 22), a toner bearing member 23, a restriction blade 24, and the toner T.

The accommodation section 20 accommodates the toner T. The toner T constitutes a magnetic one-component developer. The accommodation section 20 has an opening X. The first stirring screw 21, the second stirring screw 22, the toner bearing member 23, and the restriction blade 24 are disposed in the accommodation section 20. The accommodation section 20 is a developer container, for example.

The interior of the accommodation section 20 is divided by a partition wall 20*a* extending in the longitudinal direction (a direction perpendicular to the paper surface of FIG. 2) of the accommodation section 20 into a first stirring chamber 20*b* and a second stirring chamber 20*c*. The first stirring screw 21 and the second stirring screw 22 are arranged in parallel to the toner bearing member 23 and supported to the accommodation section 20 in a rotatable manner. The first stirring screw 21 is disposed in the first stirring chamber 20*b*. The second stirring screw 22 is disposed in the second stirring chamber 20*c*. The partition wall 20*a* does not extend to the opposite ends of the accommodation section 20 in the longitudinal direction thereof. The opposite ends thereof serve as a path in which the toner T moves between the first stirring chamber 20*b* and the second stirring chamber 20*c*.

The first stirring screw 21 transports the toner T in a first transport direction from one end to the other end of the toner bearing member 23 in the axial direction thereof (a direction perpendicular to the paper surface of FIG. 2 and a direction from the back to the front of the paper surface) while stirring the toner T in the first stirring chamber 20*b*. The second stirring screw 22 transports the toner T in a second transport direction opposite to the first transport direction while stirring the toner T in the second stirring chamber 20*c*. The second stirring screw 22 supplies the toner T to the toner bearing member 23 while transporting the toner T in the second transport direction.

The toner bearing member 23 is supported to the accommodation section 20 in a rotatable manner in an arrow direction in FIG. 2 (the anticlockwise direction in FIG. 2).

The toner bearing member 23 includes a magnetic member (not illustrated) and a sleeve (not illustrated) provided in a rotatable manner around the magnetic member. Magnetic force of the magnetic member of the toner bearing member 23 attracts the toner T being a magnetic toner in the accommodation section 20 to the toner bearing member 23. As such, the toner T in the accommodation section 20 is carried on the surface of the toner bearing member 23 (e.g., the outer circumferential surface of the toner bearing member 23).

The restriction blade 24 restricts the layer thickness of the toner T carried on the surface of the toner bearing member 23. This also restricts the amount of the toner T supplied to the image bearing member 2. The restriction blade 24 is constituted by a magnetic material. The restriction blade 24 is disposed above the toner bearing member 23 with a specific interval between the tip end of the restriction blade 24 and the toner bearing member 23. The specific interval is at least 0.2 μmm and no greater than 0.3 μmm, for example. The magnetic field generated between the restriction blade 24 and the toner bearing member 23 restricts the layer thickness of the toner T carried on the surface of the toner bearing member 23.

The toner T is charged by the toner particles 60 in the toner T coming into contact with and being rubbed against the surface of the toner bearing member 23. The toner T is also charged by the toner particles 60 coming into contact with and being rubbed against each other in the accommodation section 20 (e.g., the first stirring chamber 20*b* and the second stirring chamber 20*c*).

The toner bearing member 23 is opposite to the image bearing member 2 with the opening X therebetween. The charged toner T is supplied to the image bearing member 2 through rotation of the toner bearing member 23. Thus, the toner T is attached to the electrostatic latent image formed on the surface of the image bearing member 2. A toner image is accordingly formed on the surface of the image bearing member 2. In the manner described above, the electrostatic latent image formed on the surface of the image bearing member 2 is developed into the toner image.

The linear velocity of the image bearing member 2 is not limited particularly and can be set to at least 300 μmm/sec, for example. Setting the linear velocity of the image bearing member 2 to at least 300 μmm/sec can achieve high speed printing. However, when the linear velocity of the image bearing member 2 is a high speed of higher than 300 μmm/sec, the toner T is supplied also at high speed from the development device 1 to the image bearing member 2, tending to increase friction force applied to the toner particles 60 (see FIG. 3) in the development device 1. As described previously, the conductive layers of the alumina particles can be inhibited from peeling off from the cores thereof in the toner T even when friction force applied to the toner particles 60 in the development device 1 is strong. Therefore, the image forming apparatus 100 of the first embodiment can form images with desired image density and less fogging over a long period of time even when the linear velocity of the image bearing member 2 is a high speed of at least 300 μmm/sec. The linear velocity of the image bearing member 2 is no greater than 500 μmm/sec, for example.

In the example illustrated in FIG. 2, the image bearing member 2 is disposed at a specific distance from the toner bearing member 23. In other words, the toner bearing member 23 included in the development device 1 is spaced from the image bearing member 2. Furthermore, the toner T carried on the surface of the toner bearing member 23 is out of contact with the image bearing member 2. That is, toner projection development is applied to the image forming apparatus 100.

With the accommodation section 20, the stirring screws (corresponding to the first stirring screw 21 and the second stirring screw 22), the toner bearing member 23, and the restriction blade 24 described previously, the development device 1 can be reduced in size. Nevertheless, friction force applied to the toner T tends to increase in the development device 1 with the above configuration. However, the conductive layers of the alumina particles can be inhibited from peeling off from the cores thereof in the toner T even when friction force applied to the toner particles 60 is strong in the development device 1. Therefore, the image forming apparatus 100 of the first embodiment even including the development device 1 with the above-described configuration can form images with desired image density and less fogging for a long period of time.

The image forming apparatus 100, which is an example of the image forming apparatus of the first embodiment, has been described so far with reference to FIGS. 1 and 2. However, the image forming apparatus of the first embodiment is not limited to the image forming apparatus 100. For example, the number of the stirring screws included in the development device may be one or three or more. A development method (e.g., contact development) other than toner projection development may be applied to the image forming apparatus of the first embodiment. That is, the image bearing member and the surface of the toner bearing member or the toner particles carried on the surface of the toner bearing member may come in contact with each other in the image forming apparatus of the first embodiment.

<Toner>

The toner included in the image forming apparatus of the first embodiment is described further in detail below. The toner constitutes a magnetic one-component developer. The magnetic one-component developer does not include a carrier and includes only a toner. The toner includes toner particles. The toner particles are positively chargeable, for example.

Figure 3:
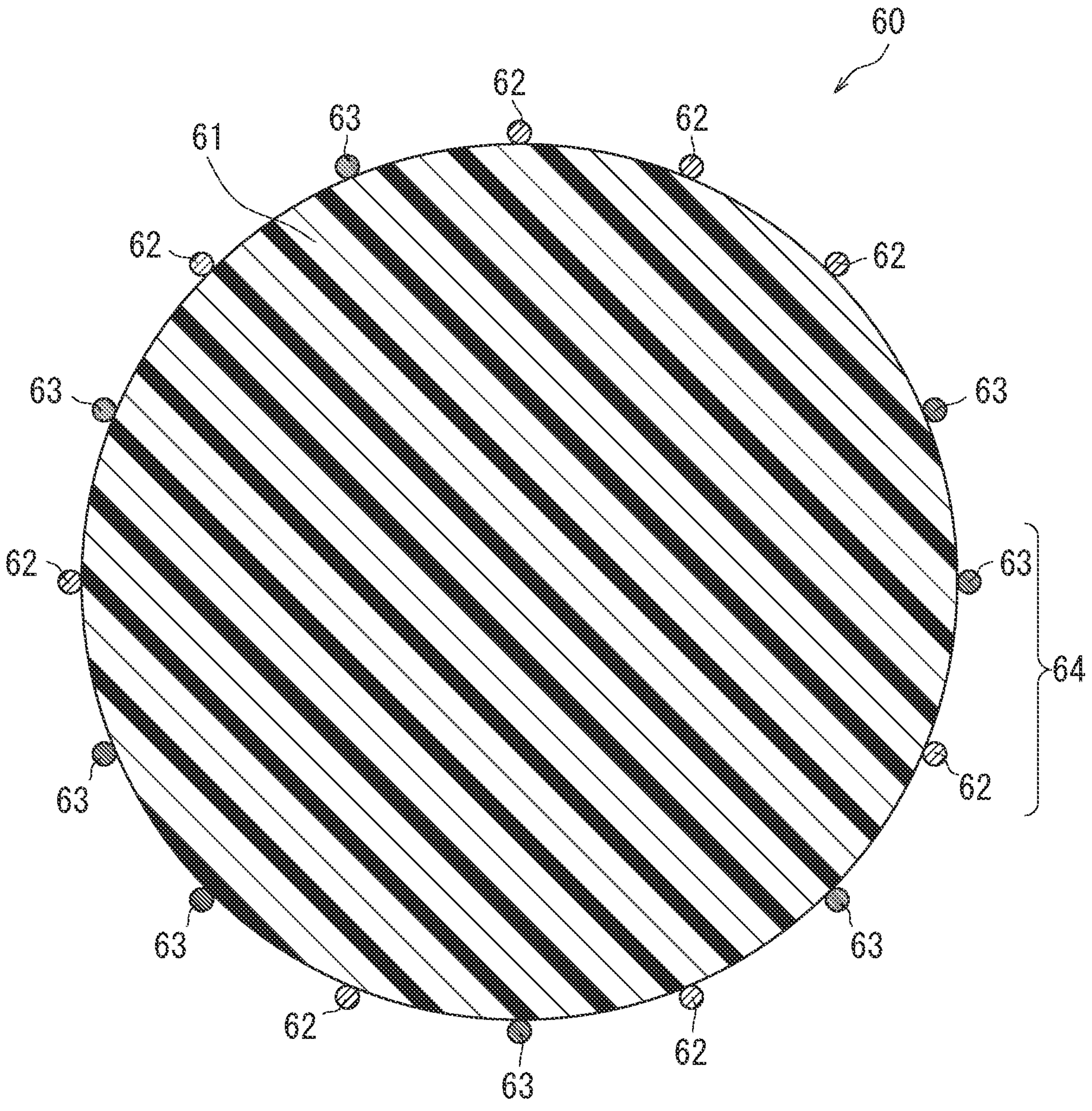
FIG. 3 is a diagram illustrating an example of the structure of a toner particle included in a magnetic toner illustrated in FIG. 2.

The following describes an example of the structure of the toner particles with reference to FIG. 3. FIG. 3 is a diagram illustrating a toner particle 60 as an example of the toner particles. The toner particle 60 is included in the toner T accommodated in the accommodation section 20 of the development device 1 illustrated in FIG. 2. The toner particle 60 illustrated in FIG. 3 includes a toner mother particle 61 and external additive particles 64. The toner mother particle 61 contains a binder resin and a magnetic powder. The external additive particles 64 are attached to the surface of the toner mother particle 61. The external additive particles 64 include alumina particles 62 and additional external additive particles 63 other than the alumina particles 62. The toner mother particles 61 have a volume median diameter ($D_{50}$) of at least 4.0 μm and no greater than 9.0 μm. One example of the structure of the toner particle 60 has been described so far with reference to FIG. 3. However, the toner particles are not limited to the toner particle 60 illustrated in FIG. 3. For example, the toner mother particles may be particles each including a shell layer. Additionally, the toner particles may not include the additional external additive particles.

The following describes the toner mother particles and the external additive particles included in the toner particles.

<External Additive Particles>

The external additive particles include alumina particles. The external additive particles may include the additional external additive particles other than the alumina particles as necessary. However, the external additive particles may not include the additional external additive particles. In terms of sufficiently exhibiting the function of an external additive while inhibiting separation of the external additive from the toner mother particles, the external additive preferably has a content ratio in the toner particles of at least 0.1 parts by mass and no greater than 10.0 parts by mass to 100 parts by mass of the toner mother particles. The alumina particles and the additional external additive particles are described below.

(Alumina Particles)

Figure 4:
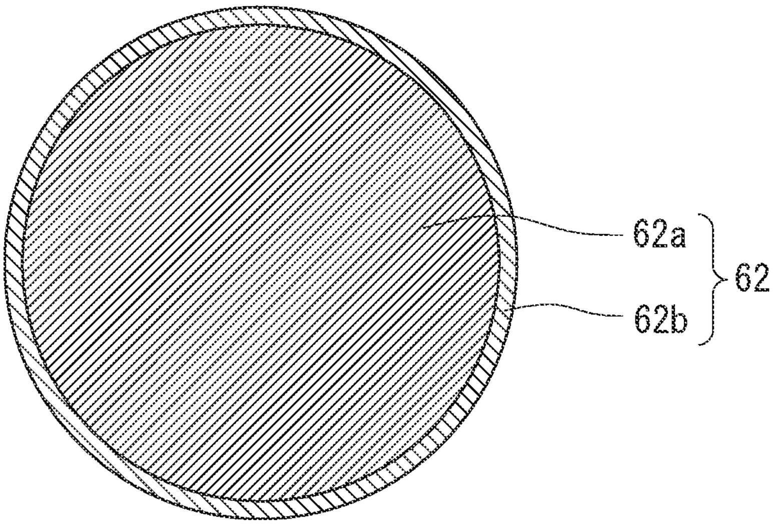
FIG. 4 is a diagram illustrating an alumina particle illustrated in FIG. 3.

With reference to FIG. 4, an example of the structure of the alumina particles is described below. FIG. 4 is a diagram illustrating an alumina particle 62 as an example of the alumina particles. The alumina particle 62 is attached to the surface of the toner mother particle 61 (see FIG. 3). The alumina particle 62 includes a core 62*a* and a conductive layer 62*b*. The core 62*a* contains alumina. The conductive layer 62*b* covers the core 62*a*. Preferably, the conductive layer 62*b* covers the entire surface of the core 62*a*. The conductive layer 62*b* contains antimony tin oxide. One example of the structure of the alumina particle 62 has been described so far with reference to FIG. 4. However, the alumina particles are not limited to the alumina particle 62 illustrated in FIG. 4. For example, the conductive layer may cover a part of the surface of the core rather than the entire surface of the core. That is, a part of the surface of the core may be exposed. Furthermore, the alumina particles may each further include a hydrophobized layer as an outermost surface layer.

The alumina particles are further described below. As described previously, the alumina particles have a number average primary particle diameter of at least 0.15 μm and no greater than 0.50 μm. The number average primary particle diameter of the alumina particles is preferably at least 0.15 μm and no greater than 0.30 μm in order to form images with desired image density even when many sheets are printed and with less fogging and inhibit occurrence of image deletion even in a high humidity environment, preferably in a high temperature and high humidity environment. The number average primary particle diameter of the alumina particles can be measured by a method described later in Examples, for example. The number average primary particle diameter of the alumina particles can be adjusted by changing time for pulverization of alumina being a raw material using a vibrating mill in preparing cores described later. The longer the time for pulverization using the vibrating mill is, the smaller the number average primary particle diameter of the alumina particles is.

As described previously, the alumina particles have a specific resistance of no greater than 250 Ω·cm. In order to form images with desired image density even when many sheets are printed and with less fogging and inhibit occurrence of image deletion even in a high-temperature and high-humidity environment, the specific resistance of the alumina particles is preferably at least 1 Ω·cm and no greater than 250 Ω·cm, more preferably at least 10 Ω·cm and no greater than 45 Ω·cm, and further preferably at least 10 Ω·cm and no greater than 30 Ω·cm. The specific resistance of the alumina particles can be measured by a method described later in Examples, for example. The specific resistance of the alumina particles can be adjusted by changing either or both the mass of a tin compound (e.g., tin(IV) chloride pentahydrate) added and the mass of an antimony compound (e.g., antimony chloride) added in conductive layer formation described later, for example. The specific resistance of the alumina particles can be adjusted also by changing the mass ratio of the added antimony compound to the added tin compound in the conductive layer formation described later.

As described previously, the alumina particles have an Sb/Sn ratio of at least 0.25 and no greater than 0.35. The Sb/Sn ratio of the alumina particles is preferably at least 0.30 and no greater than 0.35 in order to form images with desired image density even when many sheets are printed and with less fogging and inhibit occurrence of image deletion even in a high-temperature and high-humidity environment. The Sb/Sn ratio of the alumina particles is measured by X-ray fluorescence analysis, for example. The details of a method for measuring the Sb/Sn ratio of the alumina particles are described later in Examples. The Sb/Sn ratio of the alumina particles can be adjusted by changing the mass ratio of the antimony compound (e.g., antimony chloride) added to the tin compound (e.g., tin(IV) chloride pentahydrate) added in the conductive layer formation described later, for example. The Sb/Sn ratio of the alumina particles is almost the same as the Sb/Sn ratio of the conductive layers.

The cores of the alumina particles contain alumina. The crystal form of the alumina is not limited and may be α-form, for example. The alumina has a percentage content in the cores of preferably at least 90% by mass, more preferably at least 97% by mass, and further preferably 100% by mass. Preferably, the cores are spherical in shape. However, the cores may have another shape (e.g., substantially cubic angular particles). The conductive layers are extremely thin. As such, the number average primary particle diameter of the cores is almost the same as the number average primary particle diameter of the alumina particles.

The conductive layers of the alumina particles contain antimony tin oxide. The percentage content of the antimony tin oxide in the conductive layers is preferably at least 90% by mass, more preferably at least 97% by mass, and further preferably 100% by mass.

In order to charge the toner to a desired amount of charge even in a high humidity environment, the alumina particles are preferably surface treated with a hydrophobizing agent. Examples of the hydrophobizing agent include a titanate coupling agent, an aluminate coupling agent, a silane coupling agent, and a silicone oil.

The hydrophobizing agent is preferably a titanate coupling agent. That is, the alumina particles are preferably surface treated with a titanate coupling agent. The titanate coupling agent contains a titanium element. Therefore, the titanate coupling agent can render the alumina particles further chargeable in addition to rendering the alumina particles hydrophobic. Alumina particles surface treated with a titanate coupling agent have a hydrophobic group derived from the titanate coupling agent on the surfaces of the alumina particles (e.g., the outer surface of the conductive layers of the alumina particles). The alumina particles surface treated with a titanate coupling agent each include a hydrophobized layer covering for example at least a part of the outer surface of the conductive layer (i.e., the surface opposite to the surface in contact with the core), and the hydrophobized layer is a titanate coupling agent treatment layer.

The titanate coupling agent is a titanium compound having a hydrophilic hydrolytic group and a hydrophobic group, for example. Hydrophobic treatment on the surfaces of the alumina particles with a titanate coupling agent having a hydrophilic hydrolytic group and a hydrophobic group provides the hydrophobic group to the surfaces of the alumina particles. More specifically, when the surfaces of the alumina particles are treated with a titanate coupling agent having a hydrophilic hydrolytic group and a hydrophobic group, a hydroxyl group generated as a result of hydrolysis of the hydrolytic group undergoes a dehydration condensation reaction with a hydroxyl group present on the surfaces of the alumina particles. Through such a reaction, the titanate coupling agent having a hydrophobic group chemically bonds to the alumina particles to provide the hydrophobic group to the surfaces of the alumina particles.

The hydrophobic group of the titanate coupling agent is preferably an alkyl group having a carbon number of at least 8 and no greater than 20, more preferably an alkyl group having a carbon number of at least 13 and no greater than 20, and further preferably an alkyl group having a carbon number of at least 15 and no greater than 20.

The percentage content of the alumina particles in the external additive particles is preferably at least 30% by mass and no greater than 60% by mass, more preferably at least 40% by mass and no greater than 50% by mass, and further preferably at least 43% by mass and no greater than 47% by mass. The content ratio of the alumina particles is preferably at least 0.1 parts by mass and no greater than 5.0 parts by mass to 100 parts by mass of the toner mother particles, and more preferably at least 0.5 parts by mass and no greater than 2.0 parts by mass.

(Additional External Additive Particles)

Examples of the additional external additive particles include inorganic particles other than the alumina particles, and more specific examples include silica particles and titanium oxide particles. The additional external additive particles are preferably silica particles. Examples of the silica particles include fumed silica and wet silica (specific examples include sol-gel silica and silica produced by precipitation). The surfaces of silica particles may be made either or both hydrophobic and positive chargeable by a surface treatment agent. Examples of the surface treatment agent include silane coupling agents (specific examples include 3-aminopropyltrimethoxysilane), silazane compounds (specific examples include chain silazane compounds and cyclic silazane compounds), polysiloxanes (specific examples include dimethylpolysiloxane), and silicon oils (specific examples include dimethyl silicone oil).

The percentage content of the additional external additive particles in the external additive particles is preferably at least 40% by mass and no greater than 70% by mass, more preferably at least 50% by mass and no greater than 60% by mass, and further preferably at least 53% by mass and no greater than 57% by mass. The content ratio of the additional external additive particles is preferably at least 0.1 parts by mass and no greater than 5.0 parts by mass to 100 parts by mass of the toner mother particles, and more preferably at least 0.5 parts by mass and no greater than 2.0 parts by mass.

<Toner Mother Particles>

The toner mother particles of the toner particles contain a binder resin and a magnetic powder. The toner mother particles may further contain an internal additive (e.g., at least one of a releasing agent and a charge control agent) as necessary besides the binder resin and the magnetic powder. Note that the toner mother particles may further contain a known additive besides the binder resin, the magnetic powder, the releasing agent, and the charge control agent.

(Binder Resin)

In order that the toner have excellent low-temperature fixability, the toner mother particles preferably contain a thermoplastic resin as the binder resin, and more preferably contain a thermoplastic resin at a percentage content in the total of the binder resin of at least 85% by mass. Examples of the thermoplastic resin include styrene resins, acrylic resins, olefin resins (e.g., polyethylene resin and polypropylene resin), vinyl resins (e.g., vinyl chloride resin, polyvinyl alcohol, vinyl ether resin, and N-vinyl resin), polyester resins, polyamide resins, and urethane resins. Alternatively, a copolymer of any of these resins, that is, a copolymer of any of these resins (e.g., styrene-acrylic resin and styrene butadiene resin) into which any repeating unit has been introduced can be used as the binder resin.

The binder resin preferably includes a polyester resin in order that the toner has excellent low-temperature fixability. The percentage content of the polyester resin in the binder resin is preferably at least 80% by mass, more preferably at least 90% by mass, and further preferably 100% by mass.

The polyester resin can be obtained by condensation polymerization of one or more polyhydric alcohols and one or more polybasic carboxylic acids. Examples of the polyhydric alcohols for synthesis of the polyester resin include dihydric alcohols (e.g., diol compounds and bisphenol compounds) and trihydric or higher hydric alcohols. Examples of the polybasic carboxylic acids for synthesis of the polyester resin include dibasic carboxylic acids and tribasic or higher basic carboxylic acids. Note that a polybasic carboxylic acid derivative (e.g., an anhydride of a polybasic carboxylic acid or a halide of a polybasic carboxylic acid) may be used instead of a polybasic carboxylic acid.

Examples of the diol compounds include ethylene glycol, diethylene glycol, triethylene glycol, 1,2-propanediol, 1,3-propanediol, 1,4-butanediol, neopentyl glycol, 2-butene-1,4-diol, 1,5-pentanediol, 2-pentene-1,5-diol, 1,6-hexanediol, 1,4-cyclohexanedimethanol, dipropylene glycol, 1,4-benzenediol, polyethylene glycol, polypropylene glycol, and polytetramethylene glycol.

Examples of the bisphenol compounds include bisphenol A, hydrogenated bisphenol A, bisphenol A ethylene oxide adducts (e.g., polyoxyethylene(2,2)-2,2-bis(4-hydroxyphenyl)propane), and bisphenol A propylene oxide adducts (e.g., polyoxypropylene(2,2)-2,2-bis(4-hydroxyphenyl)propane).

Examples of the trihydric or higher hydric alcohols include sorbitol, 1,2,3,6-hexanetetrol, 1,4-sorbitan, pentaerythritol, dipentaerythritol, tripentaerythritol, 1,2,4-butanetriol, 1,2,5-pentanetriol, glycerol, diglycerol, 2-methylpropanetriol, 2-methyl-1,2,4-butanetriol, trimethylolethane, trimethylolpropane, and 1,3,5-trihydroxymethylbenzene.

Examples of the dibasic carboxylic acids include maleic acid, fumaric acid, citraconic acid, itaconic acid, glutaconic acid, phthalic acid, isophthalic acid, terephthalic acid, cyclohexanedicarboxylic acid, adipic acid, sebacic acid, azelaic acid, malonic acid, succinic acid, alkyl succinic acids (specific examples include n-butylsuccinic acid, isobutylsuccinic acid, n-octylsuccinic acid, n-dodecylsuccinic acid, and isododecylsuccinic acid), and alkenyl succinic acids (specific examples include n-butenylsuccinic acid, isobutenylsuccinic acid, n-octenylsuccinic acid, n-dodecenylsuccinic acid, and isododecenylsuccinic acid).

Examples of the tribasic or higher basic carboxylic acids include 1,2,4-benzenetricarboxylic acid (trimellitic acid), 2,5,7-naphthalenetricarboxylic acid, 1,2,4-naphthalenetricarboxylic acid, 1,2,4-butanetricarboxylic acid, 1,2,5-hexanetricarboxylic acid, 1,3-dicarboxyl-2-methyl-2-methylenecarboxylpropane, 1,2,4-cyclohexanetricarboxylic acid, tetra(methylenecarboxyl)methane, 1,2,7,8-octanetetracarboxylic acid, pyromellitic acid, and Empol trier acid.

The polyester resin is preferably a condensation polymer of a bisphenol A propylene oxide adduct, a bisphenol A ethylene oxide adduct, a dibasic carboxylic acid, and a tribasic carboxylic acid.

More preferably, the polyester resin is a condensation polymer of polyoxypropylene(2,2)-2,2-bis(4-hydroxyphenyl)propane, polyoxyethylene(2,2)-2,2-bis(4-hydroxyphenyl)propane, fumaric acid, and trimellitic acid. The percentage content of a repeating unit derived from polyoxypropylene(2,2)-2,2-bis(4-hydroxyphenyl)propane in all repeating units of the polyester resin is preferably at least 30% by mol and no greater than 45% by mol, and more preferably at least 35% by mol and no greater than 40% by mol. The percentage content of a repeating unit derived from polyoxyethylene(2,2)-2,2-bis(4-hydroxyphenyl)propane in all repeating units of the polyester resin is preferably at least 5% by mol and no greater than 20% by mol, and more preferably at least 10% by mol and no greater than 15% by mol. The percentage content of a repeating unit derived from fumaric acid in all repeating units of the polyester resin is preferably at least 38% by mol and no greater than 52% by mol, and more preferably at least 43% by mol and no greater than 47% by mol. The percentage content of a repeating unit derived from trimellitic acid in all repeating units of the polyester resin is preferably at least 1% by mol and no greater than 12% by mol, and more preferably at least 3% by mol and no greater than 7% by mol.

The polyester resin has a mass average molecular weight (Mw) of preferably at least 3,000 and no greater than 150,000, more preferably at least 50,000 and no greater than 100,000, and further preferably at least 80,000 and no greater than 100,000. The polyester resin has a ratio (Mw/Mn) of a mass average molecular weight (Mw) to a number average molecular weight (Mn) of preferably at least 1 and no greater than 50, and more preferably at least 20 and no greater than 30. The polyester resin has an acid value of preferably at least 5 μmgKOH/g and no greater than 15 μmgKOH/g, and more preferably at least 5 μmgKOH/g and no greater than 10 μmgKOH/g.

(Magnetic Powder)

Examples of the material of the magnetic powder include ferromagnetic metals (e.g., iron, cobalt, and nickel) and alloys thereof, ferromagnetic metal oxides (e.g., ferrite, magnetite, and chromium dioxide), and materials subjected to ferromagnetization (e.g., carbon materials rendered ferromagnetic by thermal treatment). The magnetic powder is preferably constituted by a ferromagnetic metal oxide, and more preferably constituted by magnetite.

The magnetic powder has an oil absorption of preferably at least 10 g/100 g and no greater than 50 g/100 g, more preferably at least 20 g/100 g and no greater than 40 g/100 g, and further preferably at least 25 g/100 g and no greater than 30 g/100 g.

The magnetic powder has a content ratio of preferably at least 30 parts by mass and no greater than 150 parts by mass to 100 parts by mass of the binder resin, and more preferably at least 50 parts by mass and no greater than 100 parts by mass.

The toner mother particles may not contain a colorant because the magnetic powder contained in the toner mother particles functions as a black colorant. However, the toner mother particles may further contain a black colorant. An example of the black colorant is carbon black. Alternatively, the black colorant may be a colorant adjusted to a black color using at least one of a yellow colorant, a magenta colorant, and a cyan colorant.

(Releasing Agent)

The toner mother particles may contain a releasing agent. The releasing agent is used to give offset resistance to the toner, for example. The content ratio of the releasing agent is preferably at least 1 part by mass and no greater than 20 parts by mass to 100 parts by mass of the binder resin in order that the toner has excellent offset resistance.

Examples of the releasing agent include ester waxes, polyolefin waxes (e.g., polyethylene wax and polypropylene wax), microcrystalline wax, fluororesin wax, Fischer-Tropsch wax, paraffin wax, candelilla wax, montan wax, and castor wax. Examples of the ester waxes include natural ester waxes (e.g., carnauba wax and rice wax) and synthetic ester waxes. The releasing agent is preferably carnauba wax.

(Charge Control Agent)

The toner mother particles may contain a charge control agent. The charge control agent is used to make the toner excellent in charge stability and charge rise characteristics, for example. The charge rise characteristics of the toner serve as an indicator as to whether the toner can be charged to a specific charge level in a short period of time.

As a result of the toner mother particles containing a positively chargeable charge control agent, cationic properties (positive chargeability) of the toner mother particles can be increased. As a result of the toner mother particles containing a negatively chargeable charge control agent by contrast, anionic properties (negative chargeability) of the toner mother particles can be increased.

Examples of the positively chargeable charge control agent include azine compounds, direct dye, acid dye, alkoxylated amine, alkylamide, quaternary ammonium salt, and resins having a quaternary ammonium cationic group. The charge control agent is preferably an azine compound or a resin having a quaternary ammonium cationic group.

Examples of the azine compounds include pyridazine, pyrimidine, pyrazine, 1,2-oxazine, 1,3-oxazine, 1,4-oxazine, 1,2-thiazine, 1,3-thiazine, 1,4-thiazine, 1,2,3-triazine, 1,2,4-triazine, 1,3,5-triazine, 1,2,4-oxadiazine, 1,3,4-oxadiazine, 1,2,6-oxadiazine, 1,3,4-thiadiazine, 1,3,5-thiadiazine, 1,2,3,4-tetrazine, 1,2,4,5-tetrazine, 1,2,3,5-tetrazine, 1,2,4,6-oxatriazine, 1,3,4,5-oxatriazine, phthalazine, quinazoline, and quinoxaline.

In terms of making the toner excellent in charge stability, the content ratio of the charge control agent is preferably at least 0.1 parts by mass and no greater than 20 parts by mass to 100 parts by mass of the binder resin.

<Toner Production Method>

The following describes an example of a production method of the toner included in the image forming apparatus of the first embodiment. The toner production method includes preparing alumina particles and preparing a toner. The preparing alumina particles includes preparing cores and forming conductive layers, for example. The preparing alumina particles may further include hydrophobizing as necessary.

(Preparing Cores in Preparing Alumina Particles)

In the preparing cores, the cores are prepared. The method for core preparation is not limited particularly and may be alumina pulverization followed by baking, for example. An alumina pulverization method may be alumina pulverization using a pulverizer (e.g., a vibrating mill), for example. The alumina pulverization time is at least 3 hours and no greater than 10 hours, for example. The longer the alumina pulverization time by a pulverizer is, the smaller the number average primary particle diameter of the alumina particles tends to be. Alumina pulverization may use a pulverizing aid (e.g., propylene glycol) and a pulverization medium (e.g., alumina beads) as necessary.

(Forming Conductive Layers in Preparing Alumina Particles)

In the forming conductive layers, the cores are covered with conductive layers. The following method may be an example of a method for covering the cores with the conductive layers. First, the cores are dispersed in an aqueous medium (e.g., water). Next, a solution of a tin compound (e.g., tin(IV) chloride pentahydrate) and a solution of an antimony compound (e.g., antimony chloride) are added to the dispersion of the cores. This forms provisional conductive layers on the surfaces of the cores. Note that it is preferable to keep the pH and temperature of a suspension in specific ranges (e.g., a pH 7 to 8 and a temperature 60° C. to 80° C.) in adding the solution of the tin compound and the solution of the antimony compound. The amount of the tin compound added was preferably at least 15 parts by mass and no greater than 25 parts by mass to 100 parts by mass of the cores. The amount of the antimony compound added is preferably at least 25 parts by mass and no greater than 36 parts by mass to 100 parts by mass of the cores. Thereafter, the cores with the provisional conductive layers formed thereon were baked to obtain cores covered with conductive layers containing antimony tin oxide. The baking temperature is at least 300° C. and no greater than 800° C., for example. The baking time is at least 0.5 hours and no greater than 4 hours, for example.

(Hydrophobizing in Preparing Alumina Particles)

In the hydrophobizing, the conductive layers are subjected to hydrophobic treatment. An example of a method for hydrophobizing the conductive layers is a method of mixing particles (particles including the cores and the conductive layers) before hydrophobic treatment with a hydrophobizing agent, followed by heating. The amount of the hydrophobizing agent used (in terms of effective component) is preferably at least 0.5 parts by mass and no greater than 20 parts by mass to 100 parts by mass of the particles before surface treatment, and more preferably at least 3 parts by mass and no greater than 10 parts by mass.

(Preparing Toner)

In the preparing toner, the alumina particles are attached to the surfaces of the toner mother particles to obtain toner particles. First, a binder resin, a magnetic powder, and an optional internal additive are mixed to obtain a mixture. The mixture is melt-kneaded to obtain a melt-kneaded product. The melt-kneaded product is pulverized to obtain a pulverized product. The pulverized product is classified to obtain toner mother particles. The toner mother particles and external additive particles (the alumina particles and the optional additional external additive particles) are mixed using a mixer. Through mixing, the external additive particles are attached to the surfaces of the toner mother particles to obtain a toner including the toner particles. The resultant toner can be used as a one-component developer. Note that mixing with the external additive particles is preferably performed under conditions in which the external additive particles are not completely buried in the toner mother particles. The external additive particles are attached to the surfaces of the toner mother particles by physical bond (physical power) rather than chemical bond.

Second Embodiment: Image Formation Method

The second embodiment of the present disclosure relates to an image formation method. The image formation method of the second embodiment includes developing an electrostatic latent image formed on an image bearing member into a toner image with a magnetic toner. The image bearing member is an amorphous silicon photosensitive drum. The magnetic toner is the same as the magnetic toner included in the image forming apparatus of the first embodiment. Therefore, according to the image formation method of the second embodiment, images with desired image density even when many sheets are printed and with less fogging can be formed and occurrence of image deletion can be inhibited even in a high humidity environment for the same reasons as those described in the first embodiment. The image formation method of the second embodiment is implemented by the image forming apparatus of the first embodiment, for example.

EXAMPLES

The following describes the present disclosure further in detail using examples. However, the present disclosure is not limited to the scope of the examples.

[Alumina Particle Preparation]

Alumina particles (AL-1) to (AL-13) each type of which used as an external additive were prepared according to the following methods. Production conditions and properties of the alumina particles (AL-1) to (AL-13) are shown in Table 1.

TABLE 1

| | Production condition | | | Properties | | |
|---|---|---|---|---|---|---|
| Alumina particles | Pulverization time (h) | Tin(IV) chloride pentahydrate (g) | Antimony chloride (g) | Particle diameter (μm) | Specific resistance (Ω · cm) | Sb/Sn |
| AL-1 | 6 | 18.0 | 30.0 | 0.30 | 30 | 0.30 |
| AL-2 | 8 | 18.0 | 30.0 | 0.15 | 45 | 0.30 |
| AL-3 | 4 | 18.0 | 30.0 | 0.50 | 20 | 0.30 |
| AL-4 | 6 | 16.2 | 27.0 | 0.30 | 200 | 0.30 |
| AL-5 | 6 | 17.6 | 35.2 | 0.30 | 1 | 0.35 |
| AL-6 | 6 | 22.0 | 30.8 | 0.30 | 150 | 0.25 |
| AL-7 | 6 | 16.0 | 32.0 | 0.30 | 10 | 0.35 |
| AL-8 | 12 | 18.9 | 31.5 | 0.10 | 100 | 0.30 |
| AL-9 | 2.5 | 17.1 | 28.6 | 0.70 | 20 | 0.30 |
| AL-10 | 6 | 14.4 | 24.0 | 0.30 | 300 | 0.30 |
| AL-11 | 6 | 26.4 | 31.2 | 0.30 | 160 | 0.20 |
| AL-12 | 6 | 14.0 | 34.0 | 0.30 | 5 | 0.40 |
| AL-13 | 6 | — | — | 0.30 | $3.0 \times 10^8$ | — |

The terms in Table 1 mean as follows. "Pulverization time" means a pulverization time (unit: hour) by a vibrating mill in core preparation described below. "Particle diameter" means a number average primary particle diameter (unit: μm) of alumina particles. "Specific resistance" means a specific resistance (unit: Ω·cm) of the alumina particles. "Sb/Sn" means an Sb/Sn ratio of the alumina particles.

<Production of Alumina Particles (AL-1)>

(Core Preparation)

Aluminum isopropoxide was hydrolyzed to obtain aluminum hydroxide. The aluminum hydroxide was provisionally baked to obtain an intermediate alumina. The intermediate alumina was pulverized using a jet mill and baked at a temperature of 1200° C. to obtain an alumina powder (a) constituted by α-alumina. To 300 g of the alumina powder (a), 3 g of propylene glycol being a pulverizing aid and alumina beads with a diameter of 2 μmm being a pulverization medium were added. The resultant was pulverized for 6 hours using a vibrating mill. Through the pulverization, an alumina powder (b) was obtained. The alumina powder (b) had a number average primary particle diameter of 0.30 μm.

A dispersion of the alumina powder (b) was obtained by dispersing 100 g of the alumina powder (b) in 400 g of 0.01M aluminum chloride aqueous solution. To the dispersion of the alumina powder (b), 4 kg of alumina beads with a diameter of 2 μmm being a pulverization medium were added. The resultant was mixed for 24 hours using a ball mill. In the manner described above, 500 g of an alumina slurry (S1) was obtained.

A solution containing the alumina slurry (S1) was obtained by adding 300 g of the alumina slurry (S1) obtained as above to 2 L of 1M aluminum chloride aqueous solution. Under stirring at 25° C. using a micro rotary pump, 350 g of 13.3N ammonia water was added to the solution containing the alumina slurry (S1) over 1 hour. Through the above, a slurry (S2) of an alumina hydrolyzate was obtained. The slurry (S2) had a pH of 3.8. The slurry (S2) was left to stand at 25° C. for gelation to obtain a gelled product. Water contained in the gelled product was evaporated using a constant temperature bath set at 60° C. to obtain a dry powder of a hydrolysis precipitate. The hydrolysis precipitate was crushed in a mortar to obtain a crushed product. The crushed product was put into an alumina crucible and heated to 900° C. from the room temperature at a heating rate of 300° C./hour using a box-shaped electric furnace in an atmospheric atmosphere. Subsequently, the crushed product was baked at 900° C. for 3 hours using the box-shaped electric furnace to obtain cores. The cores were fine particles constituted by α-alumina.

(Conductive Layer Formation)

A solution (I) of tin(IV) chloride pentahydrate was obtained by dissolving 18.0 g of tin(IV) chloride pentahydrate in 100 μmL of 2N hydrochloric acid. In addition, a solution (II) of antimony chloride was obtained by dissolving 30.0 g of antimony chloride in 450 μmL of 2N hydrochloric acid. A core slurry (S3) was obtained by dispersing 100 g of the cores produced in the aforementioned core preparation in 1 L of water. The slurry (S3) was heated to 70° C. and held at that temperature. Parallel dripping of 6.7N ammonia water and all amount of the solution (I) of tin(IV) chloride pentahydrate into the slurry (S3) was carried out over 40 μminutes under adjustment of the pH of the slurry (S3) to at least 7 and no greater than 8. Subsequently, parallel dripping of 6.7N ammonia water and all amount of the solution (II) of antimony chloride was carried out over 1 hour. Through the dripping, a slurry (S4) was obtained. The slurry (S4) was filtered to obtain a residue. The residue was washed and then dried at 110° C. to obtain a dried product. The dried product was treated at 500° C. for 1 hour in a nitrogen gas flow at a flow rate of 1 L/min to obtain alumina particles (c) that have been rendered conductive. The alumina particles each included a core constituted by alumina and a conductive layer covering the core. The conductive layer contained antimony tin oxide.

(Hydrophobic Treatment)

A slurry (S5) was obtained by mixing 50 g of the alumina particles (c) obtained in the aforementioned conductive layer formation, 2.5 g of isopropyl triisostearoyl titanate ("PLENACT (registered Japanese trademark) TTS", product of Ajinomoto Co., Inc.), and 40 μmL of toluene for 2 hours using a ball mill. The slurry (S5) was dried to obtain alumina particles (AL-1). The alumina particles (AL-1) each included a core constituted by alumina, a conductive layer covering the core, and a hydrophobized layer covering the outer surface of the conductive layer.

<Production of Alumina Particles (AL-2) to (AL-12)>

Alumina particles (AL-2) to (AL-12) were produced according to the same method as that for producing the alumina particles (AL-1) in all aspects other than the following changes. In the aforementioned core preparation, the pulverization time by the vibrating mill was changed to those shown in Table 1. In the aforementioned conductive layer formation, the amount of tin(IV) chloride pentahydrate added for preparing the solution (I) of tin(IV) chloride pentahydrate was changed to those shown in Table 1. In the aforementioned conductive layer formation, the amount of antimony chloride added for preparing the solution (II) of antimony chloride was changed to those shown in Table 1.

<Production of Alumina Particles (AL-13)>

Alumina particles (AL-13) were produced according to the same method as that for producing the alumina particles (AL-1) in all aspects other than that the aforementioned conductive layer formation was not carried out and cores obtained in the aforementioned core preparation were used in place of the alumina particles (c) in the aforementioned hydrophobic treatment.

[Toner Production]

Toners (T-1) to (T-13) were produced according to the following methods. The alumina particles used in production of the toners (T-1) to (T-13) were shown later in Table 2.

<Production of Toner (T-1)>

(Toner Mother Particle Production)

A mixture was obtained by mixing 100 parts by mass of a binder resin, 70 parts by mass of a magnetic powder, 1 part by mass of a first charge control agent, 5 parts by mass of a second charge control agent, and 5 parts by mass of a releasing agent using an FM mixier ("FM-10", product of Nippon Coke & Engineering Co., Ltd.). The binder resin used was a polyester resin [composition (molar ratio): polyoxypropylene(2,2)-2,2-bis(4-hydroxyphenyl)propane/polyoxyethylene(2,2)-2,2-bis(4-hydroxyphenyl)propane/fumaric acid/trimellitic acid=72/28/90/10, Mw=91,000, Mw/Mn=25, acid value=7 μmgKOH/g]. The magnetic powder used was $Fe_3O_4$ ("BL-500", product of Titan Kogyo, Ltd., shape: spherical, oil absorption: 28 g/100 g). The first charge control agent used was an azine compound ("BONTRON (registered Japanese trademark) N-71", product of ORIENT CHEMICAL INDUSTRIES CO., LTD.). The second charge control agent used was a resin ("ACRYBASE (registered Japanese trademark) FCA-201-PS", product of FUJIKURA KASEI CO., LTD.) having a quaternary ammonium cationic group. The releasing agent used was a carnauba wax (product of TOA KASEI CO., LTD.).

The resultant mixture was melt-kneaded using a twin screw extruder ("TEM-26SS", product of SHIBAURA MACHINE CO., LTD). The resultant melt-kneaded product was cooled. The cooled melt-kneaded product was roughly pulverized to a particle diameter of approximately 2 μmm using a pulverizer ("ROTOPLEX (registered Japanese trademark) Type 16/8", product of HOSOKAWA MICRON CORPORATION). The resultant roughly pulverized product was finely pulverized using a pulverizer ("TURBO MILL" Type RS, product of FREUND-TURBO CORPORATION). The resultant finely pulverized product was classified using a classifier utilizing Coanda Effect ("ELBOW JET TYPE EJ-L-3 (LABO)", product of Nittetsu Mining Co., Ltd.). The resultant classified product was further classified using a centrifugal airflow classifier (TTSP SEPARATOR (registered Japanese trademark) Type 100", product of HOSOKAWA MICRON CORPORATION) to obtain toner mother particles. The toner mother particles had a volume median diameter ($D_{50}$) of 7.0 μm.

(External Additive Addition)

Using an FM mixer ("FM-10", product of Nippon Coke & Engineering Co., Ltd.), 100.0 parts by mass of the toner mother particles, 1.2 parts by mass of silica particles ("NA130K", product of NIPPON AEROSIL CO., LTD.), and 1.0 parts by mass of the alumina particles (AL-1) were mixed for 5 μminutes. The resultant mixture was sifted using a 200-mesh sieve (opening 75 m) to obtain a toner (T-1). The toner (T-1) included toner mother particles each including a toner mother particle and external additives (the silica particles and the alumina particles (AL-1)) attached to the surface of the toner mother particle.

<Production of Toners (T-2) to (T-13)>

Toners (T-2) to (T-13) were produced according to the same method as that for producing the toner (T-1) in all aspects other than that the alumina particles (AL-1) were changed to those shown in Table 2 in the aforementioned external additive addition.

[Measurement]

With respect to the alumina particles (specifically, each type of the alumina particles (AL-1) to (AL-13)), the number average primary particle diameter, the specific resistance, and the Sb/Sn ratio were measured according to the following methods. Measurement results are shown above in Table 1.

<Number Average Primary Particle Diameter>

Using a scanning electron microscope ("JSM-6700F", product of JEOL Ltd.), a sectional image of a toner particle was taken at 30,000× magnification. Using image analysis software ("WinROOF", product of MITANI CORPORATION), equivalent circle diameters of 100 alumina particles attached to the surface of the toner particle were measured and the average value thereof was taken to be a number average primary particle diameter.

<Specific Resistance>

The specific resistance was measured in an environment at a temperature of 25° C. and a relative humidity of 50%. Into a cylindrical measurement cell of a resistance meter ("R6561", product of ADVANTEST CORPORATION), 5 g of the alumina particles were loaded. The measurement cell used was a cell having a bottom serving as a metal electrode and a cylindrical portion made from fluororesin. An electrode of the resistance meter was connected to the alumina particles loaded in the measurement cell. To the electrode of the resistance meter, a 1-kg load was applied. Subsequently, a 10-V DC voltage was applied across the electrodes and the electric resistance of the alumina particles after 1 μminute from the start of voltage application was measured. Note that the 1-kg load was continuously applied across the electrodes from the start of voltage application to the end of measurement. A specific resistance (volume resistivity) of the alumina particles was obtained using the following equation based on the measured value of electric resistance and the dimensions of the alumina particles (specifically, the alumina particles loaded in the measurement cell) in the electric resistance measurement.

(specific resistance) [Ω·cm]=(electric resistance)×(sectional area of electric current path)/(length of electric current path)

<Measurement of Sb/Sn Ratio by Fluorescent X-ray Analysis>

Using a tablet forming press ("BRE-33", product of MAEKAWA TESTING MACHINE MFG. Co., Ltd.), 0.5 g of the alumina particles were press formed into a columnar pellet with a diameter of 20 μmm. Fluorescent X-ray analysis was carried out on the resultant pellet under the following conditions to plot a fluorescent X-ray spectrum (horizontal axis: energy, vertical axis: X-ray intensity (number of photons)) exhibiting peaks derived from metal elements (antimony and tin). The X-ray intensity of a peak derived from the antimony element and the X-ray intensity of a peak derived from the tin element were determined from the plotted X-ray spectrum. Then, an Sb/Sn ratio was calculated using a calculation formula "(Sb/Sn ratio)=(X-ray intensity of peak derived from antimony element)/(X-ray intensity of peak derived from tin element)".

(Conditions of Fluorescent X-ray Analysis)

Analyzer: scanning fluorescent X-ray analyzer ("ZSX", product of Rigaku Corporation)

X-ray bulb (X-ray source): Rh (rhodium)

Excitation condition: lamp voltage of 50 kV and lamp current of 50 μmA

Measurement range (X-ray irradiation range): diameter of 30 μmm

Measured elements: antimony and tin

[Evaluation]

With respect to each of image forming apparatuses of Examples 1 to 7 and Comparative Examples 1 to 6, image density, fogging, and image deletion were evaluated according to the following methods. Evaluation results are shown below in Table 2.

<Preparation of Image Forming Apparatuses>

Monochrome printers ("ECOSYS (registered Japanese trademark) P3160dn", product of KYOCERA Document Solutions Inc.) each including a development device and a toner container were used as image forming apparatuses of Examples 1 to 7 and Comparative Examples 1 to 6. Here, an accommodation section of the development device and the toner container were loaded with one of the toners shown in Table 2. For example, a monochrome printer with the accommodation section of the development device loaded with the toner (T-1) and the toner container loaded with the toner (T-1) was used as the image forming apparatus of Example 1. Note that each of the monochrome printers included an amorphous silicon photosensitive drum. The linear velocity of the amorphous silicon photosensitive drum of each monochrome printer was set to 404 mm/sec.

<Image Density and Fogging>

Each evaluation of image density and fogging was carried out in an environment at a temperature of 23° C. and a relative humidity of 50%. Using an image forming apparatus (any of the image forming apparatuses of Examples 1 to 7 and Comparative Examples 1 to 6), an image A1 (image including a solid image area and a blank area) was printed on one sheet of plain paper and the printed image was taken to be an initial evaluation image. Next, an image B1 (character pattern image with a printing rate of 5%) was consecutively printed on 200,000 sheets of plain paper using the image forming apparatus. Next, the image A1 was printed again on one sheet of plain paper using the image forming apparatus and the printed image was taken to be a post-printing evaluation image.

The reflection density (initial ID) of the solid image area of the initial evaluation image and the reflection density (post-printing ID) of the solid image area of the post-printing evaluation image were measured using a reflectance densitometer ("RD914", product of X-Rite Inc.). The initial ID and the post-printing ID were evaluated according to the following criteria.

(Criteria of ID)

A (particularly good): ID of at least 1.300

B (good): ID of at least 1.200 and less than 1.300

C (poor): ID of less than 1.200

The reflection density of the blank area of the initial evaluation image and the reflection density of the blank area of the post-printing evaluation image were measured using a reflectance densitometer ("RD914", product of X-Rite Inc.). Separately, the reflection density of a sheet of unused plain paper was measured. Using the following equation, a fogging density (initial FD) of the initial evaluation image was calculated from the reflection density of the blank area of the initial evaluation image. Also, using the following equation, a fogging density (post-printing FD) of the post-printing evaluation image was calculated from the reflection density of the blank area of the post-printing evaluation image. The initial FD and the post-printing FD were evaluated according to the following criteria.

FD=(reflection density of blank area)−(reflection density of unused plain paper)

(Criterial of FD)

A (particularly good): FD of no greater than 0.003

B (good): FD of greater than 0.003 and less than 0.008

C (poor): FD of at least 0.008

<Image Deletion>

Evaluation of image deletion was carried out in an environment at a temperature of 32.5° C. and a relative humidity of 80%. Using an image forming apparatus (any of the image forming apparatuses of Examples 1 to 7 and Comparative Examples 1 to 6), the image B1 (character pattern image with a printing rate of 5%) was consecutively printed on 200,000 sheets of plain paper. The presence or absence of image deletion (specifically, character tailing) in the last printed image B1 (200,000th image) was visually confirmed. Image deletion was evaluated according to the following criteria.

(Criteria of Image Deletion)

A (good): Image deletion had not occurred.

B (poor): Image deletion had occurred.

tive Example 1 included the alumina particles (AL-8), a number average primary particle diameter of which was less than 0.15 μm. The image forming apparatus of Comparative Example 1 was rated as poor in evaluation of image deletion.

As shown in Tables 1 and 2, the toner particles of the toner (T-9) included in the image forming apparatus of Comparative Example 2 included the alumina particles (AL-9), the number average primary particle diameter of which was greater than 0.50 μm. The image forming apparatus of Comparative Example 2 was rated as poor in evaluation of post-printing image density.

As shown in Tables 1 and 2, the toner particles of the toner (T-10) included in the image forming apparatus of Comparative Example 3 included the alumina particles (AL-10), the specific resistance of which was greater than 250 Ω·cm. The image forming apparatus of Comparative Example 3 was rated as poor in both evaluation of post-printing image density and evaluation of fogging.

As shown in Tables 1 and 2, the toner particles of the toner (T-11) included in the image forming apparatus of Comparative Example 4 included the alumina particles (AL-11), the Sb/Sn ratio of which was less than 0.25. The image forming apparatus of Comparative Example 4 was rated as poor in both evaluation of post-printing image density and evaluation of fogging.

As shown in Tables 1 and 2, the toner particles of the toner (T-12) included in the image forming apparatus of Comparative Example 5 included the alumina particles (AL-12), the Sb/Sn ratio of which was greater than 0.35. The image forming apparatus of Comparative Example 5 was rated as poor in both evaluation of post-printing image density and evaluation of fogging.

As shown in Tables 1 and 2, the toner particles of the toner (T-13) included in the image forming apparatus of Comparative Example 6 included the alumina particles (AL-13).

TABLE 2

| | | | Initial | | | | Post-printing | | | | Image |
|---|---|---|---|---|---|---|---|---|---|---|---|
| | | Alumina | ID | | FD | | ID | | FD | | deletion |
| | Toner | particles | Value | Rating | Value | Rating | Value | Rating | Value | Rating | Rating |
| E 1 | T-1 | AL-1 | 1.412 | A | 0.002 | A | 1.378 | A | 0.003 | A | A |
| E 2 | T-2 | AL-2 | 1.433 | A | 0.002 | A | 1.398 | A | 0.003 | A | A |
| E 3 | T-3 | AL-3 | 1.354 | A | 0.002 | A | 1.287 | B | 0.004 | B | A |
| E 4 | T-4 | AL-4 | 1.362 | A | 0.003 | A | 1.276 | B | 0.005 | B | A |
| E 5 | T-5 | AL-5 | 1.322 | A | 0.003 | A | 1.289 | B | 0.003 | A | A |
| E 6 | T-6 | AL-6 | 1.388 | A | 0.002 | A | 1.266 | B | 0.006 | B | A |
| E 7 | T-7 | AL-7 | 1.435 | A | 0.002 | A | 1.289 | B | 0.005 | B | A |
| CE 1 | T-8 | AL-8 | 1.450 | A | 0.002 | A | 1.402 | A | 0.003 | A | B |
| CE 2 | T-9 | AL-9 | 1.308 | A | 0.002 | A | 1.168 | C | 0.005 | B | — |
| CE 3 | T-10 | AL-10 | 1.312 | A | 0.003 | A | 1.189 | C | 0.008 | C | — |
| CE 4 | T-11 | AL-11 | 1.368 | A | 0.002 | A | 1.145 | C | 0.009 | C | — |
| CE 5 | T-12 | AL-12 | 1.320 | A | 0.002 | A | 1.168 | C | 0.009 | C | — |
| CE 6 | T-13 | AL-13 | 1.305 | A | 0.002 | A | 1.115 | C | 0.012 | C | — |

The terms in Table 2 means as follows. "E" means Example and "CE" means Comparative Example. "Toner" means a toner loaded in the toner container and the accommodation section of the development device of a corresponding one of the image forming apparatuses of Examples and Comparative Examples. "Alumina particles" mean alumina particles of toner particles included in the loaded toner. "-" means that evaluation of image deletion was not carried out due to either or both post-printing image density and post-printing fogging being rated as poor.

As shown in Tables 1 and 2, the toner particles of the toner (T-8) included in the image forming apparatus of Compara- The alumina particles (AL-13) did not include conductive layers containing antimony tin oxide and had a specific resistance well in excess of 250 Ω·cm. The image forming apparatus of Comparative Example 6 was rated as poor in both evaluation of post-printing image density and evaluation of fogging.

By contrast, each type of the toner particles of the toners (T-1) to (T-7) included in the image forming apparatuses of Examples 1 to 7 included a corresponding one type of the alumina particles (AL-1) to (AL-7) as shown in Tables 1 and 2. The alumina particles (AL-1) to (AL-7) each included a core containing alumina and a conductive layer covering the core and containing antimony tin oxide. The alumina particles (AL-1) to (AL-7) of each type had a number average primary particle diameter of at least 0.15 m and no greater than 0.50 μm. The alumina particles (AL-1) to (AL-7) of each type had a specific resistance of no greater than 250 Ω·cm. The alumina particles (AL-1) to (AL-7) of each type had a Sb/Sn ratio of at least 0.25 and no greater than 0.35. Each of the image forming apparatus of Examples 1 to 7 was rated as good or particularly good in all of evaluation of initial image density and initial fogging, evaluation of post-printing image density and fogging, and evaluation of image deletion.

It can be determined from the above that the image forming apparatus of the present disclosure and the image formation method of the present disclosure can form images with desired image density even when many sheets are printed and with less fogging and can inhibit occurrence of image deletion even in a high humidity environment.

What is claimed is:

1. An image forming apparatus comprising:

a magnetic toner;

an image bearing member; and a development device that develops an electrostatic latent image formed on the image bearing member into a toner image with the magnetic toner, wherein the image bearing member is an amorphous silicon photosensitive drum, the magnetic toner constitutes a magnetic one-component developer and includes toner particles, the toner particles each include a toner mother particle containing a binder resin and a magnetic powder and external additive particles attached to a surface of the toner mother particle, the external additive particles include alumina particles, a percentage content of the alumina particles in the external additive particles is at least 30% by mass and no greater than 60% by mass, the alumina particles each include a core containing alumina and a conductive layer covering the core, the conductive layer containing antimony tin oxide, the alumina particles have a number average primary particle diameter of at least 0.15 μm and no greater than 0.50 μm, the alumina particles have a specific resistance of no greater than 250 Ω·cm, and the alumina particles have an X-ray intensity ratio of at least 0.25 and no greater than 0.35, the X-ray intensity ratio of the alumina particles being a ratio of an X-ray intensity of a peak derived from an antimony element contained in the alumina particles to an X-ray intensity of a peak derived from a tin element contained in the alumina particles, the X-ray intensity of the peak derived from the antimony element and the X-ray intensity of the peak derived from the tin element being measured by X-ray fluorescence analysis.

2. The image forming apparatus according to claim 1, wherein the specific resistance of the alumina particles is at least 1 Ω·cm and no greater than 250 Ω·cm.

3. The image forming apparatus according to claim 1, wherein the number average primary particle diameter of the alumina particles is at least 0.15 μm and no greater than 0.30 μm.

4. The image forming apparatus according to claim 1, wherein the number average primary particle diameter of the alumina particles is at least 0.15 μm and no greater than 0.30 μm, the specific resistance of the alumina particles is at least 10 Ω·cm and no greater than 45 Ω·cm, and the X-ray intensity ratio of the alumina particles is at least 0.30 and no greater than 0.35.

5. The image forming apparatus according to claim 1, wherein the alumina particles are surface treated with a titanate coupling agent.

6. The image forming apparatus according to claim 5, wherein the titanate coupling agent has an alkyl group having a carbon number of at least 8 and no greater than 20 as a hydrophobic group.

7. The image forming apparatus according to claim 1, wherein a linear velocity of the image bearing member is at least 300 mm/sec.

8. An image formation method comprising developing an electrostatic latent image formed on an image bearing member into a toner image with a magnetic toner, wherein the image bearing member is an amorphous silicon photosensitive drum, the magnetic toner constitutes a magnetic one-component developer and includes toner particles, the toner particles each include a toner mother particle containing a binder resin and a magnetic powder and external additive particles attached to a surface of the toner mother particle, the external additive particles include alumina particles, a percentage content of the alumina particles in the external additive particles is at least 30% by mass and no greater than 60% by mass, the alumina particles each include a core containing alumina and a conductive layer covering the core, the conductive layer containing antimony tin oxide, the alumina particles have a number average primary particle diameter of at least 0.15 μm and no greater than 0.50 μm, the alumina particles have a specific resistance of no greater than 250 Ω·cm, and the alumina particles have an X-ray intensity ratio of at least 0.25 and no greater than 0.35, the X-ray intensity ratio of the alumina particles being a ratio of an X-ray intensity of a peak derived from an antimony element contained in the alumina particles to an X-ray intensity of a peak derived from a tin element contained in the alumina particles, the X-ray intensity of the peak derived from the antimony element and the X-ray intensity of the peak derived from the tin element being measured by X-ray fluorescence analysis.

* * * * *